Aug. 21, 1928.
E. W. THURLOW
1,681,713
MOLD FOR RUBBER TIRES
Filed March 3, 1927
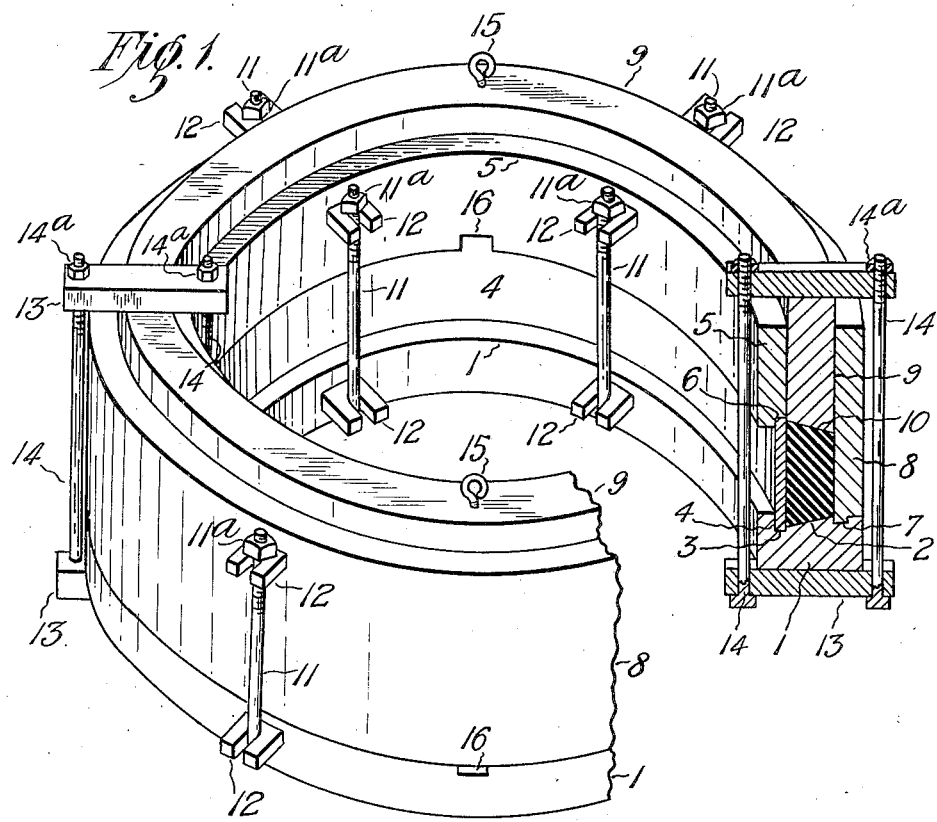
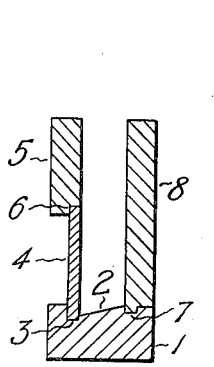
Fig.2.
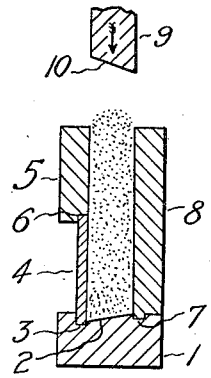
Fig.3.
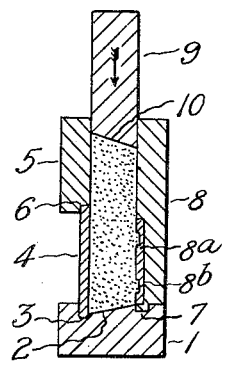
Fig.4.
Edward William THURLOW
INVENTOR;

Patented Aug. 21, 1928.

1,681,713

UNITED STATES PATENT OFFICE.

EDWARD WILLIAM THURLOW, OF MIDDLE BRIGHTON, VICTORIA, AUSTRALIA, ASSIGNOR TO VULCAN RUBBER PROPRIETARY LIMITED, OF KENSINGTON, VICTORIA, AUSTRALIA, A CORPORATION OF VICTORIA.

MOLD FOR RUBBER TIRES.

Application filed March 3, 1927, Serial No. 172,344, and in Australia July 13, 1926.

This invention relates to the molding of solid rubber tires for vehicle wheels, one object of the invention being to employ molds, parts of which are interchangeable with other parts so that tires of different widths and contours may be produced at will and without waste of rubber, none being extruded from the mold. Another object is to be able to regulate the density of rubber and obtain if desired a density exceeding that which is obtainable by the use of any other mold known to me.

The annular space in which the material to be molded is compressed is formed by a mold base having a molding face, upon which are set molding rings. Between these rings a pressure ring is depressible. One of the mold wall forming rings will form a part of the tire, constituting its base. The upper parts of the mold are connected to the base by bolts which engage lugs on the connected parts. When the material has been compressed in the mold, the parts have still to be held together for a suitable time during vulcanization, and I employ clamps to maintain the pressure, or I use any known mold holding means. My process converts old rubber when such is put in the mold in crumb or like condition, into dense rubber of good quality, the rubber of the tires produced being very durable.

In the accompanying drawings the mold is illustrated, but variations may be made in the details of construction while keeping within the scope of what is hereinafter claimed.

Figure 1 is a perspective view, partly in vertical section of the mold containing rubber which has been compressed.

Figures 2 to 4 are sections of parts of the mold.

Figure 2 shows the mold empty.

Figure 3 shows the mold filled with material to be compressed, and with a pressure ring above it.

Figure 4 shows the mold with the pressure ring in a position in which it compresses the rubber. It also shows a lining configuring plate.

1 is a mold base of ring form, having a surface 2 conforming to the contour required on a side of the tire to be produced. At one side of face 2 is a groove 3 to receive the edge of a member which is to become part of the tire, and at the other side is set a groove 7 to receive an edge of a member having a wall to act as a configuring part of the mold.

Groove 3 receives the edge of the tire ring 4, and the groove 7 receives the edge of the mold ring 8, the lower part of which will configure a tire face contacting with it. By making ring 4 of some predetermined depth the width of the resulting tire will be regulated. Ring 4 is adhered to by adjacent rubber and becomes the tire base; and when the tire is after use discarded ring 4 can be used to make a new tire. Configuring lining plates may be placed in the mold upon face 2, against ring 8, and over the rubber at 10 if desired.

Surmounting ring 4 is a mold ring 5, a face of which forms the upper portion of a wall of the mold. Ring 5 has a circumferential recess 6 which is entered by part of ring 4 so that there is a smooth wall at that side of the mold.

The width of the base of the tire to be produced is that of member 4, various widths being producible by changing that member.

Rings 1, 5, and 8 are each of one or of several connected parts, the latter arrangement promoting easy dis-assembly of configuring linings when used as at $8^a$ Figure 4 inlet in a recess $8^b$ of ring 8.

I use means to hold rings 1, 4, 5, and 8 assembled during molding, for example clamp bolts 11, having nuts $11^a$, the bolts engaging slotted lugs 12, which project from mold rings 1 and 8 on the mold outside, similar lugs projecting from mold rings 1 and 5 on the mold inside. The depth of each member 4, 5, and 8 is variable to provide an annular molding channel in the upper part of which a pressure ring 9 operates. The base of ring 9 fits slidably in the annular channel.

The pressure ring 9 by means of its lower surface contours a surface 10 of the tire opposite to surface 2. Rubber is put into the mold and then the ring 9 is by any suitable means, as hydraulic pressure, forced down into the channel upper part and the rubber becomes densely consolidated in the channel lower part.

The space under the ring 9 is not necessarily deep enough to hold initially all the rubber necessary for the production of a tire; a first supply of rubber is introduced, and is compressed, then ring 9 is raised, additional rubber is inserted in the mold, and another compression will be effected, this process being repeated until the highly compressed mass results in the tire required. When the pressure ring 9 has produced the last mentioned mass it is fixed in depressed position, by suitable means indicated by inner and outer clamp bolts 14 which, aided by nuts 14ª, hold in place the upper and lower cross bars 13. Two clamp bolts 14 are shown, but the number used may vary. The mold may then be moved where required for vulcanization. For vulcanization an autoclave can be used in the known manner, a number of molds containing the compressed rubber being held together by a hydraulic ram in the usual way.

Rubber to be compressed is inserted in the mold in a suitable condition, as in the form of small flakes which under the high compression and heating will become dense vulcanized molded rubber, the mold retaining the rubber under compression during vulcanization. The tire is shown with oblique sides, but the invention is not limited to the production of tires of that form. To ensure that the rubber flakes shall adhere to ring 4 when it is to be a permanent element of the tire, that ring is provided initially with a skin or facing of rubber or suitable material; but those surfaces of the mold to which it is intended that rubber shall not adhere are treated by soaping or in like known suitable manner.

Eyes 15 upon ring 9 are usable to facilitate the lifting of the mold by any obvious means—block and tackle for example—or to extract ring 9 from the mold.

To facilitate separation of assembled mold parts recesses 16 which allow of insertion of a lever end are provided in rings 1 and 5.

The mold could be formed of any predetermined number of rings to enclose the rubber and receive the pressure ring. When ring 4 is not to be part of the tire, one ring is usable to form the mold wall instead of a plurality.

The words "inner" and "outer" in this specification are used to indicate positions relatively to ring centres, and "upper" and "lower" relatively to the positions of parts on the drawings.

I claim:—

1. A tire mold, comprising a base member the upper surface of which is a molding face, an upstanding ring removably secured to the outer portion of the base, an upstanding rim removably seated on the inner portion of the base, an upstanding ring removably seated on the rim at its upper end, the channel between the said upstanding members being intended to receive the tire material, and a pressure ring adjustable in the channel to compress and mold the tire material.

2. A tire mold, as claimed in claim 1, in which the base member is grooved at each side of its molding face to removably seat the upstanding ring and rim in position.

3. A tire mold, as claimed in claim 1, in which the inner and outer upright sides of the base member and the opposite outside surfaces of the outside and inside rings are provided with lugs, and means carried by and operating between the lugs to hold the base member and the upstanding members together.

4. A tire mold as claimed in claim 1, including a clamping device embracing the base member and pressure ring and adapted to retain the latter in depressed position, in the channel compressing the tire material.

5. A tire mold, comprising a base having its upper surface, the molding face, an upstanding ring removably secured to the outer portion of the base to form the outer periphery of the tire, an upstanding ring removably secured on the inner portion of the base to form the base of the tire, and a pressure ring adjustable in the channel formed by the first two mentioned rings and screw operated clamping bars embracing the base and pressure ring at spaced positions about the mold to retain the pressure against the tire material deposited in said channel.

6. A tire mold, as claimed in claim 5, in which the inner upstanding ring comprises a rim below the extreme compressing position of the under surface of the pressure ring to adhere to the tire material and form a permanent part thereof.

In witness whereof I have hereunto set my hand.

EDWARD WILLIAM THURLOW.